United States Patent [19]
Brandman et al.

[11] Patent Number: 5,155,772
[45] Date of Patent: Oct. 13, 1992

[54] DATA COMPRESSION SYSTEM FOR VOICE DATA

[75] Inventors: Yigal Brandman, Palo Alto; Manoj Puri, Sunnyvale, both of Calif.

[73] Assignee: Octel Communications Corporations, Milpitas, Calif.

[21] Appl. No.: 625,496

[22] Filed: Dec. 11, 1990

[51] Int. Cl.⁵ .......................... G10L 3/02; H04B 1/66
[52] U.S. Cl. ..................... 381/32; 375/122; 381/29; 381/30
[58] Field of Search ............... 381/29, 40; 364/715.02, 364/724.01; 375/122

[56] References Cited

U.S. PATENT DOCUMENTS

| | | | |
|---|---|---|---|
| 4,449,536 | 5/1984 | Weaver | 364/715.02 |
| 4,503,510 | 3/1985 | Weaver | 375/122 |
| 4,852,129 | 7/1989 | Schwartz | 381/30 |

Primary Examiner—Dale M. Shaw
Assistant Examiner—Kee Mei Tung
Attorney, Agent, or Firm—Robert R. Jackson

[57] ABSTRACT

Digital samples of a voice signal are greatly compressed by filtering the samples to separate the information contained in them into several different frequency bands. In each of a succession of time intervals, the dominant filter output value is identified and converted to floating point form including an exponent and a generally truncated mantissa. All other filter output values for that time interval are also converted to floating point form having the same exponent. The mantissas are then further compressed by grouping values associated with each filter and again converting the mantissas in each group to floating point form having a common local exponent and submantissas. The Walsh-Hadamard transfer is also employed.

12 Claims, 7 Drawing Sheets

TWO-SAMPLE GROUP:

$$y_0 = (x_0 + x_1)/\sqrt{2}$$

$$y_1 = (x_0 - x_1)/\sqrt{2}$$

FOUR-SAMPLE GROUPS:

$$y_0 = (x_0 + x_1 + x_2 + x_3)/2$$

$$y_1 = (x_0 + x_1 - x_2 - x_3)/2$$

$$y_2 = (x_0 - x_1 - x_2 + x_3)/2$$

$$y_3 = (x_0 - x_1 + x_2 - x_3)/2$$

```
15 14 13 12 11 10 9 8 7 6 5 4 3 2 1 0
 0  0  0  0  1  1 0 1 1 1 0 0 1 1 0 1
         _____/ _____/
          MANTISSA   TRUNCATED DATA
```

$01101 \times 2^8$

```
0 0 0 1 1
0 0 0 1 0
0 0 0 0 1
0 0 0 0 1
    \___/
 SUBMANTISSA
```

```
0 0 0 0 1
0 0 0 0 0
0 0 0 0 1
0 0 0 0 1
  \_____/
 SUBMANTISSA
```

$011 \times 2^{8-2} = 011 \times 2^6$

DATA COMPRESSION SYSTEM FOR VOICE DATA

BACKGROUND OF THE INVENTION

This invention relates to methods and apparatus for reducing the amount of digital data required to acceptably represent and reproduce voice signals.

There are many applications in which there is a need for minimizing the amount of data required to acceptably represent voice signals. For example, in ordinary real-time voice transmission systems, reducing the amount of data required to represent the voice signal reduces the bandwidth required to transmit that signal or allows more voice signals to be transmitted in the same bandwidth. Similarly, in systems in which voice signals must be recorded for subsequent playback, reducing the amount of data representing the voice signal reduces the amount of storage or memory required to store a given quantity of voice information or increases the amount of voice information that can be stored in a given amount of memory. Voice processing or voice mail systems are an example of systems in which voice signals must be recorded for subsequent playback and which can benefit from reducing the amount of digital data which must be stored.

Although it is thus desirable in many situations to reduce the amount of data which must be transmitted or stored to represent voice, the quality of the voice transmitted or stored and subsequently reproduced is also frequently very important. In general, the more data that is transmitted or stored, the better the quality of the transmitted or subsequently reproduced voice. Also, although it is desirable to try to reduce cost by reducing the amount of data transmitted or stored, the data compression technique employed should not be so time consuming or computationally complex that increased processing delays or costs erode or offset the advantages of compressing the data.

In view of the foregoing, it is an object of this invention to provide improved and/or simplified methods and apparatus for compressing the digital data required to represent voice.

It is a more particular object of this invention to provide methods and apparatus for compressing voice data, which methods and apparatus effect a good compromise between minimizing the amount of data required to represent the voice signal, on the one hand, and providing high quality voice transmission or reproduction, on the other hand.

It is another more particular object of this invention to provide methods and apparatus for compressing voice data, which methods and apparatus effect a good compromise between minimizing the amount of data required to represent the voice data, on the one hand, and avoiding unduly complex and/or time consuming data compression techniques, on the other hand.

SUMMARY OF THE INVENTION

These and other objects of the invention are accomplished in accordance with the principles of the invention by filtering the voice data into a plurality of frequency bands, each of which is a portion of the frequency range of the starting voice data. The resulting digital signal samples in each of a plurality of successive time intervals are compared to identify the dominant sample in that time interval. This dominant sample is converted to floating point form having an exponent and a mantissa, the mantissa being typically truncated to some predetermined number of digits. Other samples in that same time interval are also converted to floating point form using the exponent of the dominant value. The dominant and other samples are then represented by just the dominant sample exponent and the mantissas of the dominant and other samples. If desired, the samples may be transformed using the Walsh-Hadamard transform prior to identifying the dominant value. Also if desired, the mantissas of samples associated with one or more of the frequency bands may be further compressed by again converting them to floating point form including a common local exponent and submantissas. These mantissas are then represented by the common local exponent and the submantissas.

Further features of the invention, its nature and various advantages will be more apparent from the accompanying drawings and the following detailed description of the preferred embodiments.

DETAILED DESCRIPTION OF THE PREFERRED EMBODIMENTS

Although the invention is applicable to a wide variety of voice transmission or storage and playback systems as mentioned above, the invention will be fully understood from the following explanation of its application in a voice processing or voice mail system.

Figure 1:
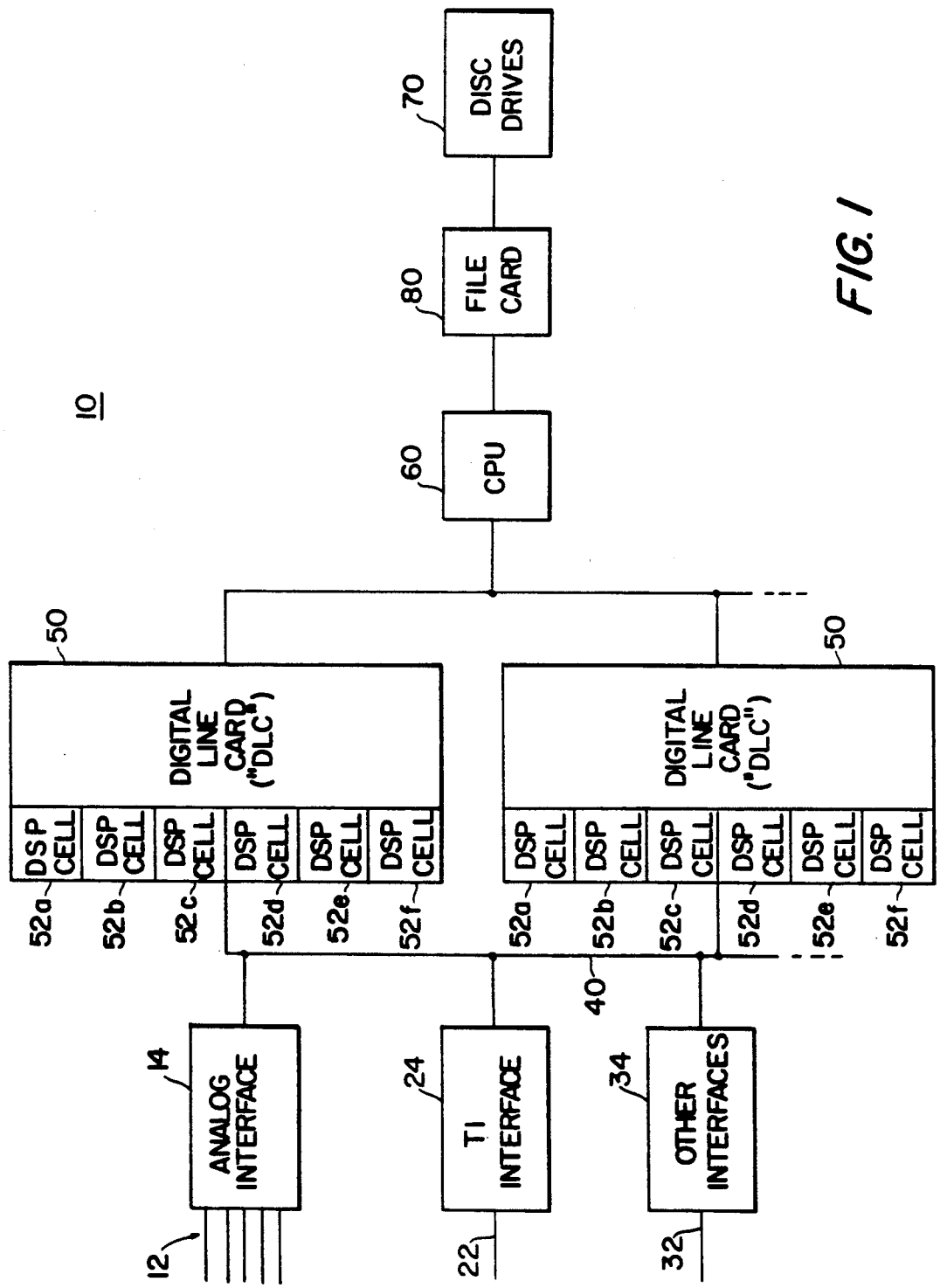
FIG. 1 is a block diagram of an illustrative voice processing system in which the present invention can be implemented and employed.

As shown in FIG. 1, a voice processing system 10 in which this invention may be employed may include a plurality of analog telephone lines 12 connected to a conventional analog interface device 14. Analog interface device 14 converts the analog voice signal on each active line 12 to pulse code modulation ("PCM") digital signals on PCM bus 40. Conventional T1 interface device 24 performs a similar function with respect to the digital ("T1") voice signal on digital telephone line 22. Other conventional interface devices 34 perform similar functions with respect to other telephone line inputs 32.

The signals on PCM bus 40 are distributed to the digital signal processor ("DSP") portions 52a-f of one or more digital line cards ("DLC") 50. Each DLC 50 includes six DSP cells 52a-f and a micro-processor such as a model 386 microprocessor available from Intel Corporation of Santa Clara, Calif. Each DSP cell 52 can handle the data from two analog telephone lines and includes a microprocessor such as a model TMS320C25 microprocessor available from Texas Instruments Incorporated of Houston, Tex.

Overall system control is provided by central processing unit ("CPU") 60. CPU 60 may include a suitably programmed microprocessor such as an Intel model 386 microprocessor. CPU 60 is supported by one or more conventional disc drives 70 and conventional file card 80. Disc drives 70 are the mass memory for the system (e.g., the ultimate repository of voice messages left on the system). File card 80 controls disc drives 70, including such functions as which disc is to be used, disc redundancy, etc.

The flow of much of the information in the above-described elements is, of course, bidirectional. Thus analog interface device 14, for example, not only converts incoming analog telephone signals to incoming digital signals on bus 40, but also converts outgoing digital signals on bus 40 to outgoing analog signals on the appropriate ones of analog lines 12. Similarly, DLCs 50 (including DSPs 52) appropriately pass voice information and other data in both directions between bus 40 and CPU 60. CPU 60 acts similarly with respect to the passage of voice information and other data in both directions between elements 50, on the one hand, and elements 70 and 80, on the other hand.

In the context of the foregoing voice processing system, the object of the present invention is to compress the digital voice data on PCM bus 40 so that less data must be stored in memory 70, thereby reducing the amount of memory 70 that is required to store a given amount of voice message material or allowing memory 70 of a given capacity to store an increased amount of voice message material. For example, a voice signal can be stored digitally and reproduced substantially without distortion by sampling the applied signal at 8 KHz and using 13 binary digits ("bits") to represent each sample. This would require storage of 104 K bits per second. Conventional PCM coding (used on bus 40 in FIG. 1) reduces this requirement to 64 K bits per second. However, the object of this invention is to reduce the required number of bits per second much further, while still allowing very high quality reproduction of the original voice sound. The actual data compression of this invention is performed in each DSP cell 52. Accordingly, pertinent functions of a representative DSP cell 52 are shown in more detail in FIG. 2, as will now be discussed.

As has been mentioned, the PCM samples on bus 40 of a given voice signal are at 8 KHz. DSP cell 52 performs a PCM-to-linear conversion 102. The resulting binary data is subjected to bandpass filtering in the five bands 104a-e indicated in FIG. 2. Note that these five bands are mutually exclusive of one another and collectively exhaustive of a voice frequency range from 125 Hz to 3000 Hz. Filters 104 may employ conventional digital filtering techniques to perform the indicated bandpass filtering.

Figure 3:
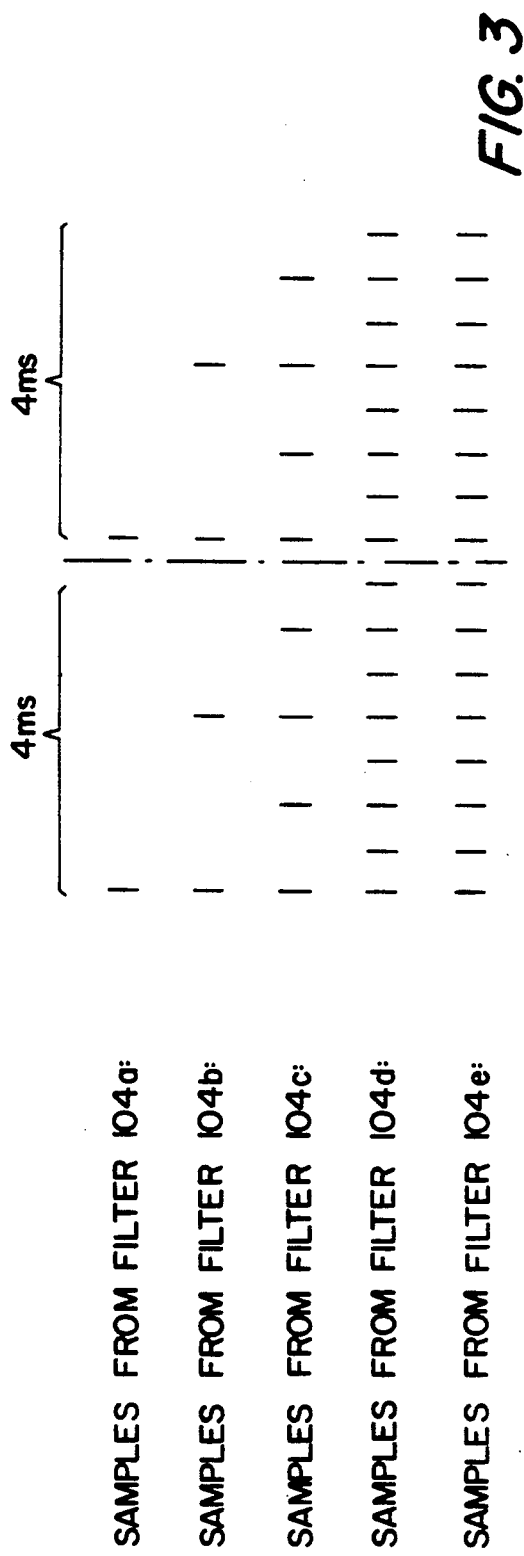
FIG. 3 is a timing diagram of signal samples associated with the apparatus of FIG. 2.

In each successive 4 millisecond ("ms") time interval, one output sample from filter 104a will be further processed as described below, two output samples (separated by 2 ms) from filter 104b will be further processed as described below, four output samples (separated by 1 ms) from filter 104c will be further processed as described below, and eight output samples (separated by 5 ms) from each of filters 104d and 104e will be further processed as described below. FIG. 3 is a graphical representation of the filter output samples which are further processed as described object of the further processing is to reduce each of the further processed samples to a smaller number of bits by representing it as a (generally truncated) mantissa of four or five bits and an exponent which is common for all of the samples in that 4 ms time interval and which therefore needs to be stored only once for all of the samples in that time interval. (Five-bit mantissas are used for the outputs of filters 104a-c, and four-bit mantissas are used for the outputs of filters 104d and 104e.) In addition, to reduce the number of bits required to represent the mantissas, adjacent samples from each filter are grouped together and represented by a common local exponent and submantissas of only the length required to preserve the original mantissa information which is not represented by the common local exponent. These are acceptable and efficient strategies for voice signal processing because it is most important to preserve information from the dominant frequency band at any given instant of time, and because successive samples from a given frequency band very often have similar values and can therefore be efficiently represented with reference to a common exponent.

Figure 2:
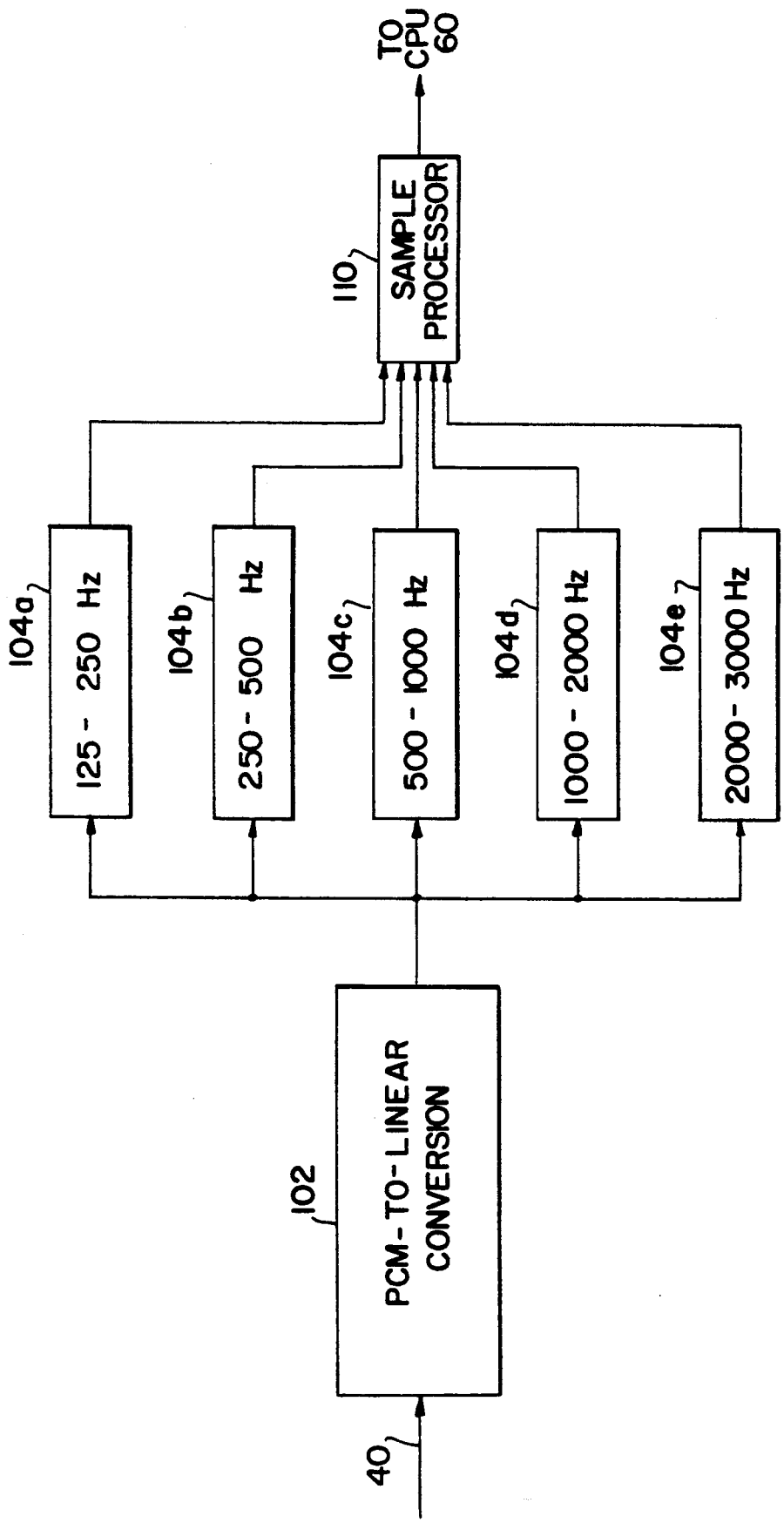
FIG. 2 is a more detailed block diagram of a portion of the apparatus of FIG. 1 in accordance with this invention.
Figure 4A:
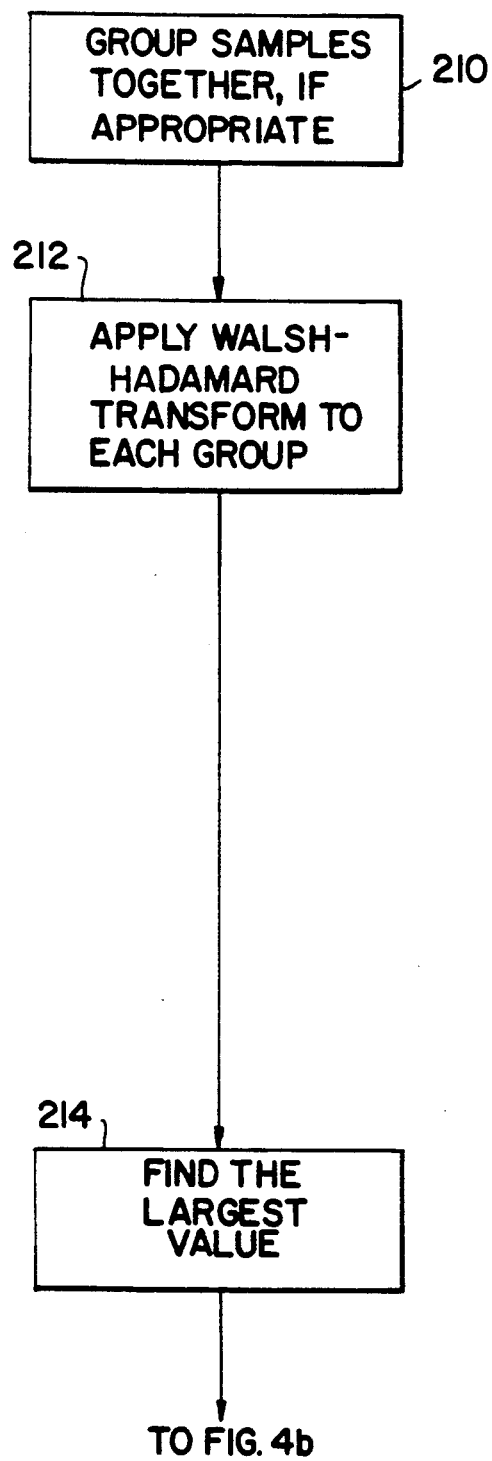
FIGS. 4a–c (hereinafter referred to collectively as FIG. 4) comprise a flow chart illustrating portions of the invention.
Figure 4B:
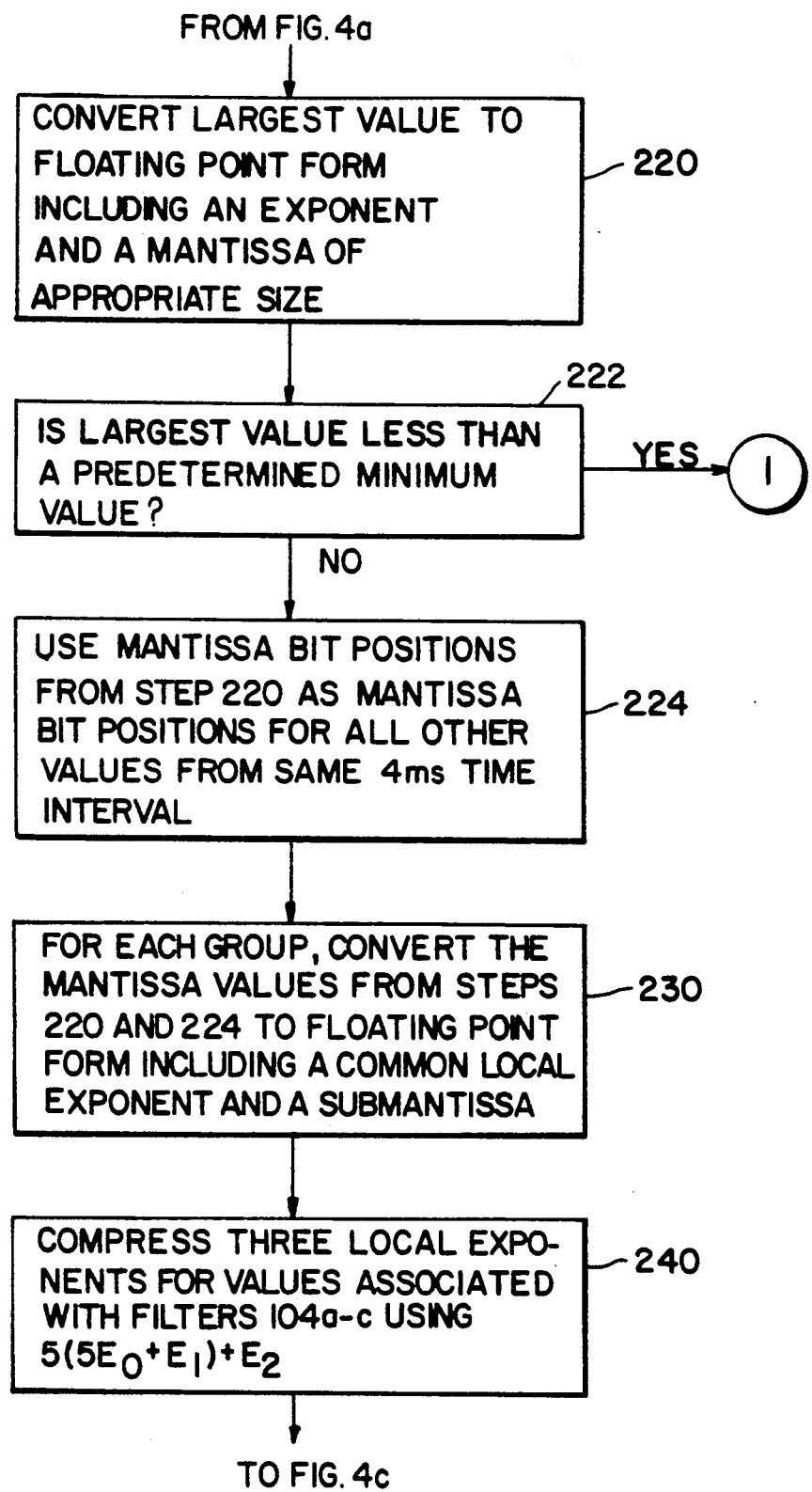
Figure 4C:
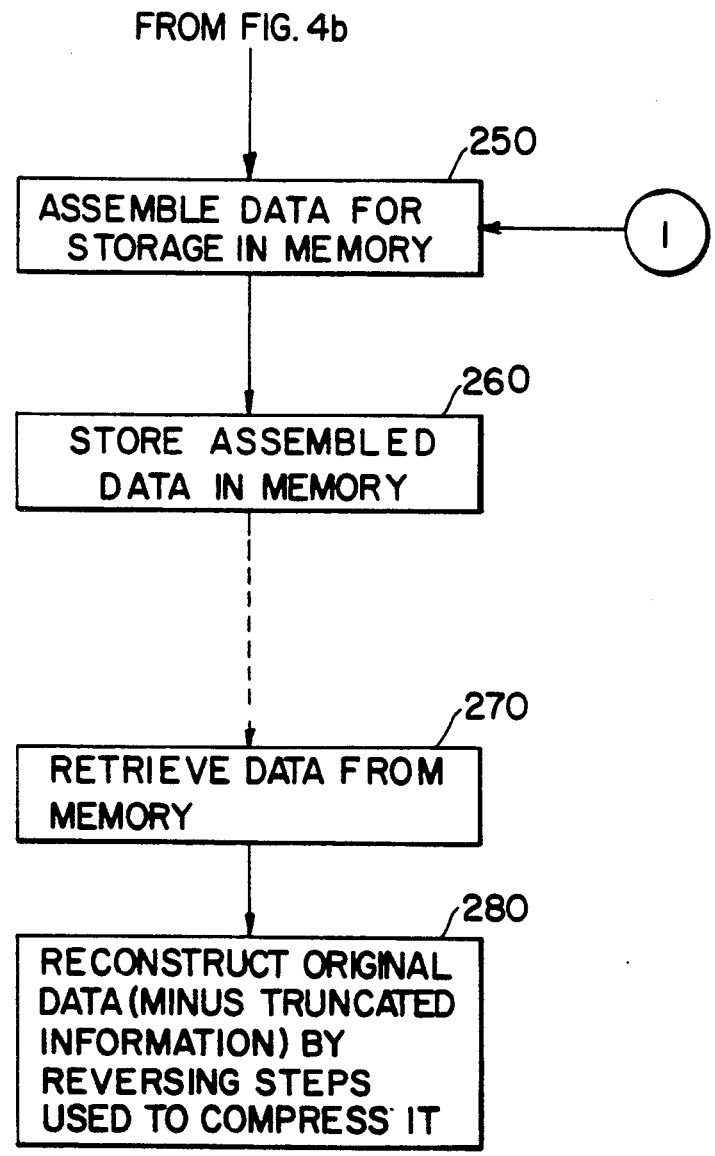

The processing outlined above is performed by sample processor 110 in FIG. 2, which represents certain functions of the microprocessor in DSP cell 52. The steps of this processing are shown in FIG. 4.

Figure 5:
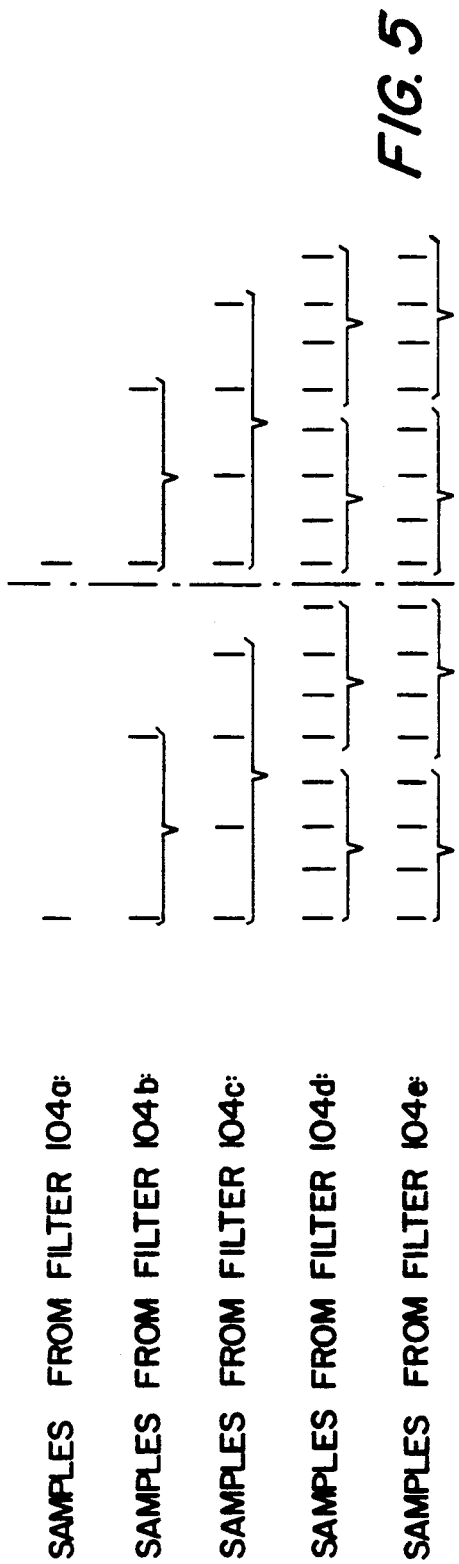
FIG. 5 is similar to FIG. 3 and shows illustrative groupings of the signal samples in accordance with this invention.

The samples mentioned above and indicated in FIG. 3 are grouped or considered together in step 210 (FIG. 4) as shown in FIG. 5. In particular, in each 4 ms time interval the output sample from filter 104a is treated by itself (i.e., not grouped with any other samples), the two output samples from filter 104b are treated in a group of two samples, the four output samples from filter 104c are treated in a group of four samples, and the eight output samples from each of filters 104d and 104e are also treated in groups of four samples.

In order to reduce the variance among the samples in each group (so that less information tends to be lost when the resulting data is subsequently truncated with reference to a common exponent), the samples in each group are preferably transformed in step 212 using the appropriate Walsh-Hadamard transform shown to the right of box 212 in FIG. 4. In these transforms, the x values are the original sample values, and the y values are the transformed values. As mentioned above, the Walsh-Hadamard transform reduces the variance among the samples, but the original sample values can be regenerated by performing the same transform a second time on the transformed values. For convenience herein, the values which result from performance of the Walsh-Hadamard transform on the bandpass filter output samples are also sometimes referred to herein as samples of the voice signal, without attempting to distinguish them from the untransformed bandpass filter output samples.

In step 214 the largest value among the 23 values resulting from step 212 is determined.

Figures 6, 7, 8, 9, 10:
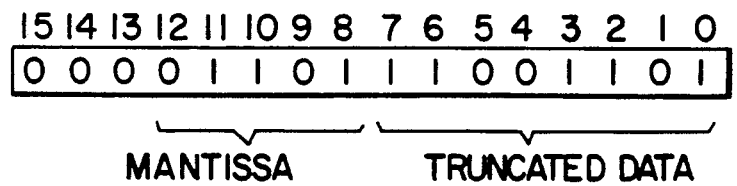
FIG. 6 shows a typical signal sample and how it is partly processed in accordance with this invention.
FIG. 7 shows another representation of the signal sample of FIG. 6 in accordance with this invention.
FIG. 8 shows portions of several typical signal samples for purposes of illustrating how those signal sample portions are further processed as a group in accordance with this invention.
FIG. 9 shows another representation of one of the signal sample portions from FIG. 8.
FIG. 10 is similar to FIG. 8 and shows another example of a group of typical signal samples.

In step 220 the largest value found in step 214 is converted to floating point form including five bits if the largest value is from any of filters 104a-c, or four bits if the largest value is from filter 104d or e). For example, if the largest value determined in step 214 is from filter 104c and has the value shown in the box in FIG. 6 (where the power of two associated with each bit position is shown outside the box above the bit position), the mantissa is the most significant five bits containing meaningful data. The exponent associated with such a five-bit mantissa is 11 minus the number of bit positions to the left of the mantissa. Thus in the example shown in FIG. 6 the exponent is $11-3=8$. (The number 11 in the immediately preceding discussion is 12 in the case of four-bit mantissas.) The data to the right of the mantissa is truncated (i.e., not used except possibly for rounding the mantissa as discussed below). Thus the truncated mantissa-exponent form of the exemplary value shown in FIG. 6 is as shown in FIG. 7.

The rounding technique employed in truncating mantissas in accordance with this invention is preferably balanced so that numbers like 1.5 are rounded to 2, but numbers like $-1.5$ are rounded to $-2$.

In step 222 the largest value determined in step 220 is compared to a predetermined minimum value. If the largest value is less than this minimum, control passes from step 222 to step 250 where only the exponent of the largest value is saved (as a place holder value) and all other data from this 4 ms time is discarded because it is assumed that this data is only representative of noise. If the largest value is greater than the minimum, control passes from step 222 to step 224.

In step 224 the bit positions of the mantissa determined in step 220 are used as a mask to extract a mantissa value from each of the 22 other values from step 212. For example, if the mantissa was found to occur in bit positions 12 through 8 as shown in FIG. 6, then the data contained in bit positions 12 through 8 in each of the 22 other values from step 212 is used as the mantissa of that other value. In this way, the floating point form exponent of each of the other values is forced to be the same as the exponent for the largest value. Also, in each such other value the data to the right of the mantissa is truncated (i.e., not used except for rounding, preferably as discussed above). If the mantissa determined in step 220 is a five-bit mantissa, then other values for which only four-bit mantissas are allowed (i.e., values associated with filters 104d and e) are further truncated to four bits. On the other hand, if the mantissa determined in step 220 is a four-bit mantissa, then other values for which five-bit mantissas are used (i.e., values associated with filters 104a–c) are extended (to the right as viewed in FIG. 6) to include one more bit.

In step 230 the mantissa data from steps 220 and 224 is further compressed by again converting that data to floating point form including a submantissa and a relative or local exponent on the basis of the groups indicated in FIG. 5. In other words, for each group indicated in FIG. 5, a single local exponent is determined which can be used for all of the mantissa values from steps 220 and 224 for that group, and any remaining mantissa data is saved as a submantissa. For example, if the four mantissa values from steps 220 and 222 are as shown in the boxes in FIG. 8, then the local exponent for this group is 2 (because the two left-most bits are not needed for any value in this group), and only the three right-most bits must be kept as a submantissa for each value. Assuming that FIGS. 6, 7, and 8 all relate to data from the same 4 ms time interval, then the truncated mantissa-exponent form of the exemplary value shown in the first box in FIG. 8 is as shown in FIG. 9. Note that the length of the submantissas resulting from the performance of step 230 may vary from group to group. Thus, for example, if the four mantissas from steps 220 and 224 for another group were as shown in the boxes in FIG. 10, the local exponent would be 3 and only two-bit submantissas would have to be kept as indicated in FIG. 10.

In step 240 the three local exponents for the values associated with filters 104a–c, which otherwise would require three bits each, are compressed to seven bits using the transform shown in step 240 (where the three values of E are respectively the three local exponents for the values associated with filters 104a–c).

In step 250 the data from the preceding steps for each 4 ms time interval is assembled for storage in memory 70 as follows: four bits are used for the global exponent (from step 220), seven bits are used for the compressed low frequency range local exponents (from step 240), eight bits are used for the high frequency range local exponents (from step 230; two bits are used for the local exponent for each of the four groups in the higher frequency range), and as many bits are used as are required to represent all of the submantissas (from step 230) one after another. The single sample from filter 104a is also stored as a local exponent and a submantissa. On the other hand, if step 250 was reached directly from step 222, only the global exponent (from step 220) is saved for storage in memory 70 and all other data from that 4 ms time interval is discarded as merely representative of noise.

In step 260 the assembled data is stored in memory 70, which ends the data compression and storage process.

When the recorded voice message information is to be played back, steps 270 and 280 are performed. In step 270, the data stored in accordance with step 260 is retrieved from memory 70. In step 280 the steps used to compress that data are substantially reversed to recreate the original data (minus the information discarded via truncation).

Whereas storing the uncompressed PCM data from bus 40 would require storing 64 K bits per second, the above-described preferred embodiment of this invention requires storing only about 18 K bits per second but still gives very good voice quality when the recorded data is retrieved and reconstructed as a voice signal.

It will be apparent that the foregoing is merely illustrative of the principles of this invention, and that various modifications can be made by those skilled in the art without departing from the scope and spirit of the invention. For example, the lengths of the mantissas can be changed if desired, and not all of the steps set forth above need to be performed in every application.

The invention claimed is:

1. Apparatus for reducing digital data that is required to represent a digital voice signal which has a predetermined frequency range, said apparatus comprising:
    means for filtering said digital voice signal in order to separate said digital voice signal into a plurality of digital subsignals, each of which is representative of a portion of said digital voice signal which corresponds to one of a plurality of frequency bands within said predetermined frequency range, each of said subsignals comprising a succession of digital signal samples;
    means for comparing digital signal samples in each of a succession of predetermined time intervals in order to identify a dominant sample in each time interval;

means for converting said dominant sample in each time interval to floating point form including an exponent and a truncated mantissa;

means for converting other samples in said time interval to floating point form having the same exponent as said dominant sample and having truncated mantissas; and means for representing said dominant sample and said other samples in said time interval by said exponent of said dominant sample and said mantissas of said dominant and other samples.

2. The apparatus defined in claim 1 wherein said frequency bands are effectively mutually exclusive of one another and effectively collectively exhaustive of said predetermined frequency range.

3. The apparatus defined in claim 1 further comprising:

means for transforming the samples associated with at least one of said frequency bands during each time interval using a Walsh-Hadamard transform prior to operation of said means for comparing.

4. The apparatus defined in claim 1 wherein said means for representing comprises:

means for converting the mantissas of a plurality of samples associated with at least one of said frequency bands during each time interval to floating point form including a common local exponent and submantissas, and representing the mantissas of said plurality of samples by said common local exponent and said submantissas.

5. The apparatus defined in claim 4 wherein said submantissas have only as many digits as are required to represent the portions of said mantissas which are not represented by the associated common local exponent.

6. The apparatus defined in claim 1 further comprising:

means for comparing the dominant sample in each time interval to a predetermined minimum value and, if said dominant sample in a time interval is less than said predetermined minimum value, causing said means for representing to represent said dominant and other samples for that time interval by a place holder value rather than by said mantissas of said dominant and other samples.

7. The method of reducing digital data that is required to represent a digital voice signal which has a predetermined frequency range, said method comprising the steps of:

filtering said digital voice signal in order to separate said digital voice signal into a plurality of digital subsignals, each of which is representative of a portion of said digital voice signal which corresponds to one of a plurality of frequency bands within said predetermined frequency range, each of said subsignals comprising a succession of digital signal samples;

comparing digital signal samples in each of a succession of predetermined time intervals in order to identify a dominant sample in each time interval;

converting said dominant sample in each time interval to floating point form including an exponent and a truncated mantissa;

converting other samples in said time interval to floating point form having the same exponent as said dominant sample and having truncated mantissas; and representing said dominant sample and said other samples in said time interval by said exponent of said dominant sample and said mantissas of said dominant and other samples.

8. The method defined in claim 7 wherein said frequency bands are effectively mutually exclusive of one another and effectively collectively exhaustive of said predetermined frequency range.

9. The method defined in claim 7 further comprising the step of:

transforming samples associated with at least one of said frequency bands during each time interval using a Walsh-Hadamard transform prior to performing said comparing step.

10. The method defined in claim 7 wherein said representing step comprises the steps of:

converting the mantissas of a plurality of samples associated with at least one of said frequency bands during each time interval to floating point form including a common local exponent and submantissas; and representing the mantissas of said plurality of samples by said common local exponent and said submantissas.

11. The method defined in claim 10 wherein said submantissas have only as many digits-as are required to represent the portions of said mantissas which are not represented by the associated common local exponent.

12. The method defined in claim 7 further comprising the step of:

comparing the dominant sample in each time interval to a predetermined minimum value and, if said dominant sample in a time interval is less than said predetermined minimum value, modifying said representing step by representing said dominant and other samples for that time interval by a place holder value rather than by said mantissas of said dominant and other samples.

* * * * *

UNITED STATES PATENT AND TRADEMARK OFFICE
CERTIFICATE OF CORRECTION

PATENT NO. : 5,155,772
DATED : October 13, 1992
INVENTOR(S) : Yigal Brandman et al.

It is certified that error appears in the above-indentified patent and that said Letters Patent is hereby corrected as shown below:

| Column | Line | |
|---|---|---|
| Abstract | 14 | Change "transfer" to --transform--. |
| 4 | 4 | Change "5" to --.5--. |
| 4 | 8 | After "described" insert --below. Each filter output sample is 16 bits. The--. |
| 4 | 67 | After "including" insert --an exponent and a mantissa of appropriate size (i.e.,--. |
| 8 | 40 | Delete the hypen. |

Signed and Sealed this

Twenty-fourth Day of May, 1994

Attest:

BRUCE LEHMAN

Attesting Officer        Commissioner of Patents and Trademarks